United States Patent [19]

Brandes et al.

[11] Patent Number: 5,672,926
[45] Date of Patent: Sep. 30, 1997

[54] HYBRID-ENERGIZED ELECTRIC MACHINE

[75] Inventors: Jürgen Brandes, Bad Neustadt; Uwe Schüller, Ilmenau, both of Germany

[73] Assignee: Siemens Aktiengesellschaft, München, Germany

[21] Appl. No.: 602,484

[22] Filed: Feb. 20, 1996

[30] Foreign Application Priority Data

Feb. 21, 1995 [DE] Germany ............... 195 05 966.2

[51] Int. Cl.⁶ ............... H02K 21/04; H02K 21/12
[52] U.S. Cl. ............... 310/181; 310/114; 310/126; 310/156; 310/261; 322/46
[58] Field of Search ............... 310/181, 183, 310/144, 126, 156, 263, 261; 322/46

[56] References Cited

U.S. PATENT DOCUMENTS

| | | | |
|---|---|---|---|
| 3,047,755 | 7/1962 | Angst et al. | 310/156 |
| 3,743,873 | 7/1973 | De Jong | 310/156 |
| 4,339,679 | 7/1982 | Urschel | 310/40 |
| 4,358,697 | 11/1982 | Liu et al. | 310/156 |
| 4,476,408 | 10/1984 | Honsinger | 310/156 |
| 4,486,679 | 12/1984 | Jones | 310/218 |
| 5,030,867 | 7/1991 | Yamada et al. | 310/156 |
| 5,097,166 | 3/1992 | Mikulic | 310/156 |
| 5,233,248 | 8/1993 | Kawamura et al. | 310/88 |
| 5,281,879 | 1/1994 | Satake et al. | 310/114 |
| 5,285,563 | 2/1994 | Nove et al. | 290/596 |
| 5,397,975 | 3/1995 | Syverson | 322/46 |

FOREIGN PATENT DOCUMENTS 0 620 634   10/1994   European Pat. Off. .

*Primary Examiner*—Steven L. Stephan
*Assistant Examiner*—Tran Nguyen
*Attorney, Agent, or Firm*—Kenyon & Kenyon

[57] ABSTRACT

A hybrid-energized electric machine includes a laminated stator core that has a stator winding and is arranged in a magnetic yoke, where the rotor is divided axially into two rotor halves, and each rotor half has permanent-field poles and non-energized poles arranged in succession in accordance with the pole pitch, where one rotor half is fitted with permanent magnets of one polarity (N) and the other rotor half is fitted with permanent magnets of the other polarity (S), and the permanent-field poles of both rotor halves are offset with respect to each other by one pole pitch, and said electric machine is also provided with an electric field coil designed as a ring coil. Both scattering and line losses can be reduced due to the fact that rotor halves are arranged on the rotor shaft with an axial distance between them, and field coil is inserted into the space between rotor halves.

15 Claims, 4 Drawing Sheets

HYBRID-ENERGIZED ELECTRIC MACHINE

BACKGROUND OF THE INVENTION

The present invention is related to U.S. patent application Ser. No. 08/604,137 attorney docket number 67190/953037), which is entitled Hybrid-Energized Electric Machine, was filed on the same date as the present application and is hereby incorporated by reference.

The present invention relates generally to hybrid-energized electric machines, and more particularly to a hybrid-energized electric machine with a laminated stator core that is arranged in a magnetic yoke and which supports a stator winding, in which the rotor is divided axially into two rotor halves, and each rotor half has poles that are energized with a permanent magnet as well as poles that are not energized in accordance with the pole pitch, where one rotor half is provided with permanent magnets of one polarity (N) and the other rotor half is provided with permanent magnets of the other polarity (S), and the permanent field poles of both rotor halves are offset with respect to each other by one pole pitch, and the machine also includes an electric field coil designed as a ring coil.

Such a machine is known from European patent A 620,634. In this known machine, the laminated stator core is divided axially into two core halves, and the field coil that is needed for electric field excitation is arranged between the two halves of the core. With such a field coil arranged in the stator, there is a great deal of scattering within the area of the stator teeth because the field coil is arranged on the outside radially toward the stator rear. In addition, the arrangement of the field coil between the two halves of the laminated stator core requires a complicated procedure to manufacture the stator. Since the field coil has a large diameter, a great deal of line material is needed for the field coil, and there are also greater line losses in the coil.

The present invention is directed to the problem of developing a hybrid-energized electric machine of the above type which employs a stator with a traditional design, yet has reduced scattering and line losses.

SUMMARY OF THE INVENTION

The present invention solves this problem by providing that the rotor halves are arranged on the rotor shaft with an axial distance between them, and that the field coil is inserted into the space formed between rotor halves. The arrangement of the field coil in the rotor results in a smaller diameter of the coil, so that less line material is needed, while at the same time the losses are reduced because the electric resistance of the field coil is lower. The field coil is also closer to the air gap, which leads to a reduction in leakage flux. The field coil is assembled by simply mounting it on the rotor shaft.

For technical manufacturing reasons, it may be advantageous for the permanent magnets to be arranged on the surface of the rotor halves. Another possibility for reducing the electric power needed to regulate the speed and voltage of the machine is due to the fact that the permanent magnets are inserted into receptacle holes that are provided in the laminated core of each rotor half and extend in the circumferential direction, where the design and arrangement of the receptacle holes is such that a magnetic short-circuit of the permanent magnets inserted into the holes is prevented. Accommodating the permanent magnets in the rotor core, eliminates the need for any mounting devices that would be necessary if the permanent magnets were arranged on the outer surface of the rotor core, which would increase the size-of the air gap.

Magnetic short-circuiting of the permanent magnets inserted into the receptacle holes can be prevented easily by designing the secant-like parts of the rotor core that are adjacent to the receptacle holes toward the circumference of the rotor so they are connected to the neighboring non-energized pole parts only by means of saturation segments.

The permanent magnets are preferably mounted in the receptacle holes by embedding the permanent magnets in a thermosetting plastic compound such as a casting resin.

Assembly is facilitated if the winding of the field coil is arranged on a winding support. This yields an appropriate strength for the field coil and also provides greater protection against mechanical stresses. This protection is further increased by the fact that the winding support is enclosed by means of a wall part on its peripheral side that corresponds to the peripheral side of the rotor halves. If the peripheral wall part is connected to a side wall of the winding support that extends radially, this eliminates the need for additional assembly work for mounting such a wall part.

If the winding support has a U-shaped cross section in the axial direction, then the desired closed condition of the winding support in the circumferential direction is obtained from the beginning when the winding support is installed, while on the other hand the winding can easily be introduced into the winding support through the side of the winding support that is still open until it is installed.

Assembly of the rotor is facilitated and simplified by the fact that the rotor halves and the field coil are designed as individual modules that can be handled independently and are mounted on the rotor shaft. The corresponding parts can be manufactured separately and then need only be mounted on the rotor shaft by an appropriate insertion technique.

It is advantageous to arrange the winding support on the rotor shaft in such a way that it is secured rotationally. This is accomplished easily by providing axial projections on the winding support that engage in matching recesses in the laminated cores of one or both halves of the rotor.

Both the electric and mechanical safety can be improved by embedding the winding support and/or the winding mounted on the winding support in a thermosetting plastic compound.

DETAILED DESCRIPTION

Figure 1:
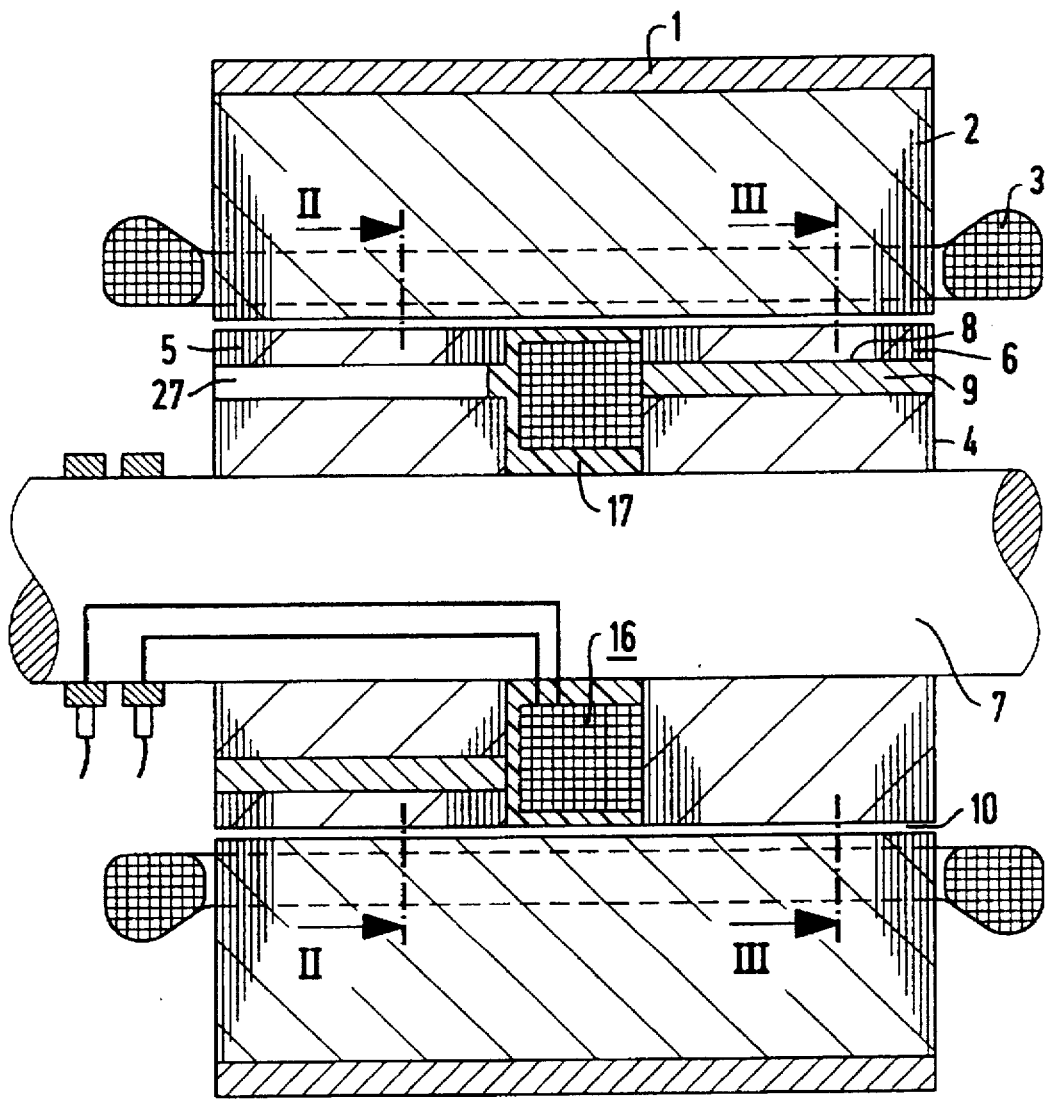
FIG. 1 shows a schematic diagram of a longitudinal section through a hybrid-energized electric machine.

The hybrid-energized synchronous machine illustrated in FIG. 1 has a laminated stator core 2 that is arranged in a yoke 1 and is provided with a stator winding 3. Rotor 4 of this machine is divided axially into two rotor halves 5 and 6 that are mounted on shaft 7 of rotor 4 with an axial spacing between them. Receptacle holes 8 in which permanent magnets 9 are inserted are provided in the laminated core of each rotor half 5 and 6. Permanent magnets 9 can be retained in these holes by a thermosetting plastic compound that is cast in receptacle holes 8. Permanent magnets 9 are arranged with regard to their polarity in one half 5 of the rotor in such a way that their north pole N points toward air gap 10 of the machine. Permanent magnets 9 are arranged in the other half 6 of the rotor in such a way that their south poles S point toward air gap 10. Permanent magnets 9 of one rotor half 5 are also offset by one pole pitch with respect to permanent magnets 9 of the other rotor half 6.

Figure 3:
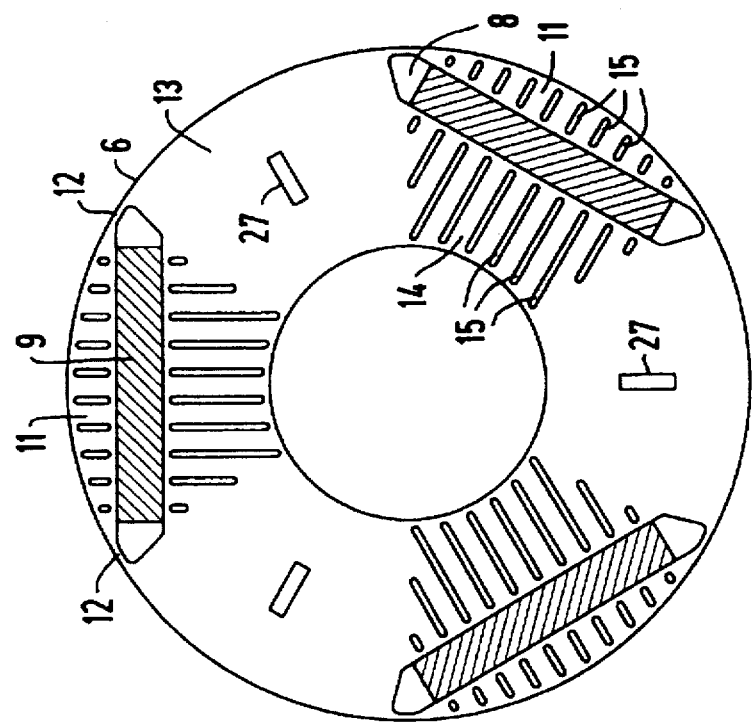
FIG. 3 shows a sectional view of the rotor of the machine along line III—III in FIG. 1.
Figure 2:
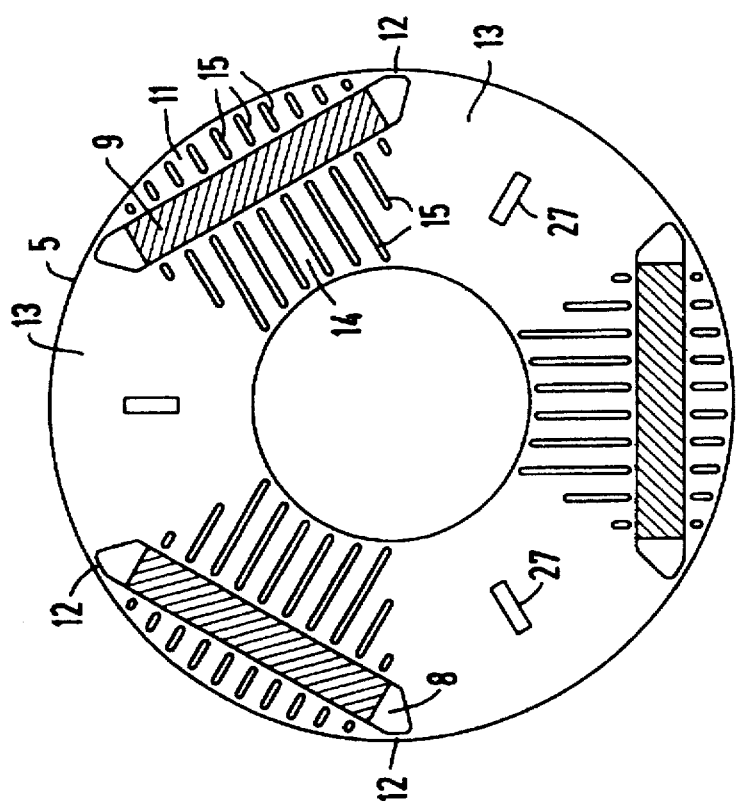
FIG. 2 shows a sectional view of the rotor of the machine along line II—II in FIG. 1.

As shown in FIGS. 2 and 3, secant-like core parts 11 of the laminated core of the respective rotor halves 5 and 6 that extend over one pole pitch each and follow receptacle holes 8 radially on the outside are connected by narrow saturation segments 12 to neighboring pole parts 13 that are not equipped with permanent magnets—in other words, pole parts 13 that are not energized. Non-energized pole parts 13 also extend over one pole pitch each on the periphery. Saturation segments 12 provide mechanical stability for secant-like core parts 11 while also preventing a magnetic short-circuit of permanent magnets 9 inserted into receptacle holes 8. Due to the arrangement of permanent magnets 9 in the laminated core there is a great mechanical security with respect to the centrifugal force that occurs with the rotational movement of rotor 4. Thus, such a rotor is also suitable for very high speeds.

Slots 15 are provided in secant-like core parts 11 and pole sectors 14 that follow receptacle holes 8 radially inward toward rotor shaft 7. These slots run essentially parallel to the magnetic flux extending through these parts. Therefore, the magnetic resistance in the transverse direction to the magnetic flux is increased by these slots 15 and thus the scattering losses are reduced.

Figure 4:
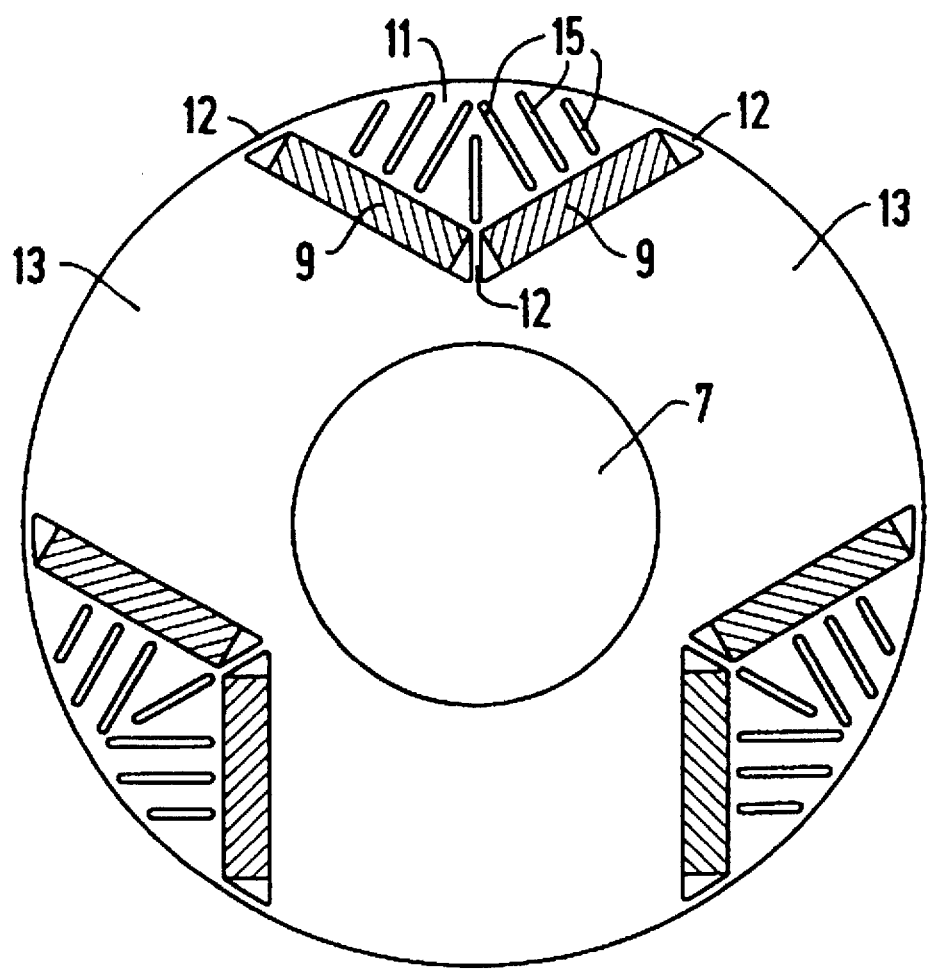
FIG. 4 shows another possible arrangement of permanent magnets in the rotor core.

FIG. 4 shows another variant of the arrangement of permanent magnets 9 in the laminated core of rotor halves 5 and 6. More magnetic material can be accommodated in the laminated core as a result of the inclined position of permanent magnets 9.

An electric field coil 16 that is designed as a ring coil is provided in the interspace between the two halves 5 and 6 of the rotor.

Figure 5:
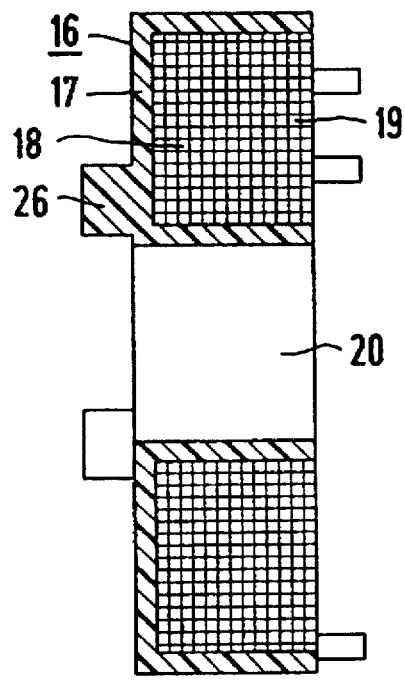
FIG. 5 shows a winding support that has a U-shaped design in the axial direction and is provided with a field winding.

This field coil 16 has a winding support 17 on which winding 18 of the field coil is mounted. According to the embodiment illustrated in FIG. 5, winding support 17 has a U-shaped cross section in the axial direction, so an annular space 19 is formed. Winding 18 can be introduced easily during manufacture into annular space 19 which is open on one side. Winding support 17 can be mounted on rotor shaft 4 with inside opening 20 of annular space 19.

Figure 6:
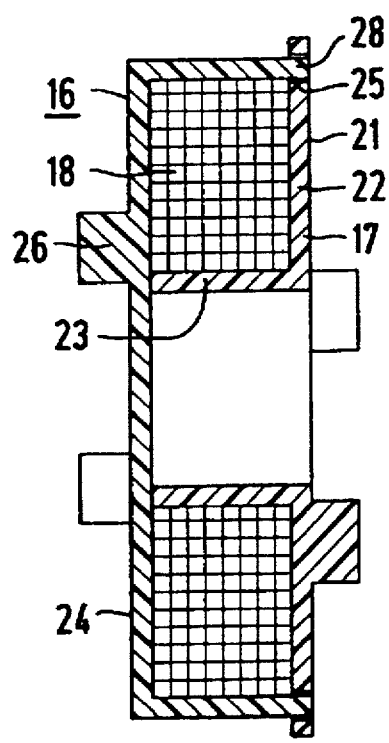
FIG. 6 shows another embodiment of a winding support.

FIG. 6 shows a winding support 17 that is designed in two parts. A first part 21 consists of a flange wall 22 that runs radially and has an axially projecting hollow hub 23 molded onto it: With this hollow hub 23, winding support 17 can be mounted on rotor shaft 4. A second part 24 of winding support 17 is designed in the shape of a pot and serves as a cover part. With such a two-part winding support, winding 18 can be wound on the outer circumference of hollow hub 23 without any hindrance at first. Then cover part 24 is attached and can be connected to the first part 21 by means of catch projections 26 that engage in catch holes 25 in flange wall 22. This yields a cover for winding 18 that is closed on all sides.

Additional electric and mechanical protection is achieved by embedding winding 18 which is mounted on winding support 17 in a casting compound.

In addition to winding support 17, the two rotor halves 5 and 6 can also be designed as module parts that can be handled independently. Then these module parts are mounted on rotor shaft 4 and attached to it to form rotor 4. Field coil 16 is mounted on rotor shaft 4 after attaching one rotor half 5 or 6. In the axial direction, field coil 16 is secured between the two rotor halves 5 and 6. In order to also prevent it from twisting, axial projections 26 are provided on winding support 17 and engage in corresponding retaining slots 27 provided on the face side of the laminated cores of rotor halves 5 and 6. Retaining slots 27 can be formed by punching out areas in the individual laminations of the laminated cores.

A magnetic flux that increases or reduces the magnetic flux of permanent magnets 9 can be generated by field coil 16, which is supplied with direct current. This yields a large control range for regulating the speed and voltage of the machine. As a result of the arrangement of field coil 16 in the rotor of the machine, the field coil extends close to or directly up to air gap 10 of the machine. This greatly reduces the scattering losses. Less copper is needed for winding 18 because of the small diameter of field coil 16 in comparison with a design where the field coil is arranged in the stator, as in the state of the art. Since field coil 16 requires a suitable field current to generate a certain magnetic flux, the electric losses are much smaller when field coil 16 is arranged in the rotor, because the electric resistance of field coil 16 is lower due to the shorter length of the winding wire, which is determined by the diameter.

What is claimed is:

1. A hybrid-energized electric machine comprising:
   a) a magnetic yoke;
   b) a stator winding;
   c) a laminated stator core being disposed in the magnetic yoke and supporting the stator winding;
   d) a rotor shaft;
   e) a rotor being divided axially into a first rotor half and a second rotor half, forming a space therebetween, said first rotor half including:
      (i) a first permanent magnet having a first polarity (N);
      (ii) a first plurality of permanent field poles that are energized by the first permanent magnet; and
      (iii) a first plurality of non-energized poles that are not energized by the first permanent magnet, wherein the first plurality of permanent field poles and the first plurality of non-energized poles are interspersed according to pole pitch; and
   said second rotor half including:
      (i) a second permanent magnet having a second polarity (S);
      (ii) a second plurality of permanent field poles that are energized by the second permanent magnet; and
      (iii) a second plurality of non-energized poles that are not energized by the second permanent magnet, wherein the second plurality of permanent field poles and the second plurality of non-energized poles are interspersed according to pole pitch, and the first and second plurality of permanent field poles are offset with respect to each other by one pole pitch;
   f) an electric field ring coil, wherein said first and second rotor halves are arranged on said rotor shaft with an axial distance between them; and
   g) a field coil being disposed into said space formed between said first and second rotor halves.

2. The machine according to claim 1, wherein said first and second permanent magnets are disposed on a surface of said first and second rotor halves, respectively.

3. The machine according to claim 1, further comprising a plurality of receptacle holes provided in the laminated core of each rotor half and extending in a peripheral direction, wherein said first and second permanent magnets are disposed in the plurality of receptacle holes, wherein an arrangement and design of the plurality of receptacle holes is such that a magnetic short-circuit of the first and second permanent magnets inserted into the plurality of receptacle holes is prevented.

4. The machine according to claim 3, further comprising:
   a) a plurality of saturation segments; and
   b) a plurality of secant-like core parts of the laminated rotor core being adjacent to the plurality of receptacle holes towards a periphery of the rotor and being connected to neighboring non-energized pole parts only by means of the plurality of saturation segments.

5. The machine according to claim 3, further comprising a thermosetting plastic compound securing the first and second permanent magnets in the plurality of receptacle holes.

6. The machine according to claim 4, further comprising a thermosetting plastic compound securing the first and second permanent magnets in the plurality of receptacle holes.

7. The machine according to claim 1, further comprising a winding support on which the winding of the field coil is arranged.

8. The machine according to claim 7, further comprising a wall part, wherein the winding support is enclosed by means of the wall part on a peripheral side that corresponds to a peripheral side of the rotor halves.

9. The machine according to claim 8, wherein the winding support comprises a side wall that extends radially and said wall part on the peripheral side is connected in one piece to the side wall of the winding support.

10. The machine according to claim 9, wherein the winding support includes a U-shaped cross section in an axial direction.

11. The machine according to claim 1, wherein the first and second rotor halves and the field coil are designed as individual modules that can be handled independently of each other and can be mounted on the rotor shaft.

12. The machine according to claim 7, wherein the winding support is mounted on the rotor shaft in such a way that it is secured rotationally.

13. The machine according to claim 12, further comprising a plurality of axial projections on the winding support, and a plurality of corresponding recesses, wherein the plurality of axial projections engage in the plurality of corresponding recesses in the laminated cores of one or both rotor halves.

14. The machine according to claim 12, wherein the winding support is held on the rotor shaft by a force fit.

15. The machine according to claim 7, wherein the winding support and/or winding that is mounted on winding support is embedded in a thermosetting plastic compound.

* * * * *